June 23, 1964  O. DITTRICH ETAL  3,138,034
LINK CHAIN FOR TRANSMITTING POWER BY FRICTION
FOR INFINITELY VARIABLE GEARS
Filed June 5, 1961

INVENTOR.
Otto Dittrich, Erhardt Karig
and Herbert Steuer
BY
Bailey, Stephens & Huettig
ATTORNEYS

United States Patent Office 3,138,034
Patented June 23, 1964

3,138,034
LINK CHAIN FOR TRANSMITTING POWER BY FRICTION FOR INFINITELY VARIABLE GEARS
Otto Dittrich, Erhardt Karig, and Herbert Steuer, Bad Homburg vor der Hohe, Germany, assignors to Reimers Getriebe K.G., Ascona, Switzerland, a firm of Switzerland
Filed June 5, 1961, Ser. No. 114,821
Claims priority, application Germany June 11, 1960
6 Claims. (Cl. 74—236)

The present invention relates to a link chain for infinitely variable gears in which the driving power is transmitted by friction between the chain and cone pulleys consisting of adjustable disks with smooth surfaces, and in which each pair of pulley disks and the chain surrounding the same are continuously moistened either by a lubricant or in special cases by a cooling liquid.

Although the present invention is primarily concerned with link chains and pulleys of metal, it is also applicable to chains or pulleys of plastics with properties resembling those of metals.

There are different known types of cone pulley drives which are provided with serrated pulleys and with laminated chains in which the driving power is not transmitted by friction but by positive interengagement between the chain and the pulleys. It has, however, been found that if such gears should remain properly operative for a sufficient length of time, they can only be subjected to a limited load which is not sufficient to comply with extreme requirements as occur, for example, in vehicles.

For transmitting the driving power purely by friction in gears which are provided with pairs of cone pulley disks with smooth surfaces, so-called roller chains have proved to be quite satisfactory in which on or within the strand of the chain cylindrical rollers are provided which theoretically have only a point contact with the surfaces of the friction pulleys. However, due to the high Hertzian pressures at the contact points between the chain and pulleys, these contact points actually develop into elliptical surfaces which extend along the entire width of the rollers. The unavoidable wear occurring in all types of roller chains is equally distributed by the continuous rotation of the rollers to the entire surface thereof so that despite such wear the rollers retain their cylindrical shape for a long time. Although these chains are very efficient, they have the disadvantage that they can be produced only at a very high expense.

For transmitting the driving power by friction in infinitely variable gears with smooth pulley surfaces, there are also link chains known which are provided with pressure exerting elements (hereafter simply called "pressure members") which extend transverse to the direction of travel of the chain and have a surface contact with the surfaces of the pulleys. Since the transmission of power by friction is always accompanied in such gears by small slipping movements between the surfaces which transmit the friction and since the wear upon parts sliding along each other is proportional to the surface pressure between these parts, the pressure members of these known gears were at first provided with relatively large contact surfaces in order to transmit the greatest possible forces at the lowest possible surface pressure. However, it was then found that in view of the short length of time during which the pressure members engage with each friction pulley between the moment when they first engage with the pulley and the moment when they leave the pulley, the surface pressure between the pressure members and the friction pulleys must be very high in order to press through the liquid coating on the pulley surfaces. If the gear operates under a high load and with a contact pressure in proportion to the load, the surface pressure will adjust itself. If, however, the gear works only under a partial load and the surface pressure decreases below a certain value, the chain will no longer press through the liquid coating and, because of the hydrodynamic friction with its very small frictional values which will then occur, the chain will start to slip relative to the pulleys. Any measures which may be applied to the gear in order to prevent this, for example, an increased chain tension, are expensive and reduce the efficiency of the gear.

Gears operating with chains which have pressure members with large surfaces do not therefore transmit the power reliably, especially after they have been in operation for a longer time when due to wear large and very smooth contact surfaces are formed on the faces of the pressure members.

Various attempts have been made to overcome this disadvantage of the engagement of large contact surfaces by making the pressure members relatively narrow and by providing their contact surfaces with bores or with grooves extending parallel to the longitudinal axis of the chain. This additional interruption of the contact surfaces reduces, however, the bearing capacity of each pressure member extremely so that, if the power to be transmitted is very high, the surface pressures will also be very high. Pressure members of this type of construction are therefore subject to a relatively strong wear.

Furthermore, it has been found that, due to the webs of the contact surfaces which primarily extend parallel to the longitudinal axis of the chain, the possibility still prevails that a hydrodynamic friction will be formed between the pressure members and the friction pulleys. Chains of this type of construction have likewise not proved successful since, aside from their disadvantage of a very severe wear, they are still liable to slip.

The same disadvantage is inherent in another known chain construction which is provided with pressure members in the form of packs of leaf springs which are superimposed upon each other in a direction vertical to the direction of travel of the chain so that the contact surfaces of these pressure members are composed of the narrow end surfaces of the leaf springs which extend in the direction of travel of the chain. With this type of chain the danger of the occurrence of a hydrodynamic friction and surfboard effect is extremely prevalent.

It was the object of another development to make the contact of the chain with the pulleys as linear as possible. For this purpose, the surfaces of the parts engaging with the friction pulleys were made of a cylindrical shape. When employing such a chain, the unavoidable wear will, however, likewise very soon result in the formation of a surface of a great length in the peripheral direction so that at small contact pressures a hydrodynamic friction can easily occur with the result that the chain will start to slip.

It is an object of the present invention to overcome the above-mentioned disadvantages of the link chains according to prior designs and to provide a link chain for the power transmission by friction in infinitely variable gears by means of pulleys consisting of pairs of conical disks with smooth, continuously moistened surfaces.

Another object of the invention is to provide a link chain of the mentioned type which comprises pressure members which extend transverse to the direction of travel of the chain and have a large contact surface but exert a low surface pressure upon the cone pulleys. Further objects of the invention are to provide a link chain of this type which may be easily and inexpensively manufactured, which is capable of transmitting very great power even though it is of small dimensions, and which is entirely safe from slipping even at a very small surface pressure.

These objects may be attained according to the invention by the provision of pressure members with contact surfaces which are adapted to engage with the surfaces of the cone pulley disks and are divided into a larger number of surface elements which are disposed behind each other, as seen in the direction of travel of the chain.

A preferred feature of the invention consists in dividing the contact surfaces of the pressure members into individual surface elements by laminating the pressure members and by doing this in a manner so that the surfaces separating the individual laminations extend substantially vertically in the direction of travel of the chain. Such a laminated pack may, for example, consist of a series of thin layers or sheets which are adapted to exert considerable friction and are separated from each other by shorter intermediate layers or sheets. It is, however, also possible to provide solid pressure members with a series of cuts or notches in the opposite faces thereof and extending transverse to the longitudinal direction of the chain. The division of the contact surfaces of the pressure members into individual surface elements which are disposed behind each other in the direction of travel of the chain may also be carried out to such an extent that each pressure member is made in the form of a cablelike bundle of thin parallel rods which extend transverse to the direction of travel of the chain.

By dividing the contact surfaces in accordance with the invention into a larger number of surface elements which are disposed behind each other as seen in the direction of travel of the chain, the friction of the chain on the cone pulleys and thus also the power transmission attainable thereby will be greatly improved and the amount of wear upon the chain will be considerably reduced since the total surface area of all surface elements engaging with the pulley surfaces is relatively large so that the surface pressure may be made relatively small with the result that the wear upon the pressure members will also be small. On the other hand, the division of the contact surfaces of the chain or the pressure members thereof into laminar elements prevents entirely the formation of a hydrodynamic friction and surfboard effect and thus any slipping of the chain resulting therefrom. This phenomenon, which has been proved by numerous tests, may be explained by the fact that when a pressure member on the running chain enters between the pulley disks, the individual surface elements immediately displace the liquid coating from their points of contact with the pulley disks into the gaps between the surface elements so that each individual surface element immediately acts upon the surfaces of the pulley disks with a relatively high friction. On the other hand, the transverse division of the contact surfaces prevents even at a low surface pressure the formation of a hydrodynamic surfboard effect which might cause the chain to slip. It is therefore not necessary to apply a very high contact pressure between the contact surfaces of the pressure members and the surfaces of the pulley disks by means of a strong chain tension and chain pull, and it is now possible by means of such a chain to transmit a high power within a small area. Another great advantage of this chain is that it has a very great durability and will remain fully effective for a very long time.

Another advantageous feature of the invention consists in inserting the pressure members into suitable apertures in the chain links which extend transverse to the direction of travel of the chain, and in mounting them within these apertures so as to be capable of sliding therein to a limited extent. By this limited slidability it is possible to compensate for any possible misalignment between the driving and driven pulleys of the gear. The pressure members are preferably made of such a shape that the forces occurring normally on the contact surfaces will intersect with each other at the center of the chain so that any tilting of the chain about its longitudinal axis will be prevented.

Aside from providing the chain links with pressure members of the mentioned design which may be either rigidly connected to, integral with, or slidable relative to the chain links, and may be formed either by cuts in their contact surfaces, by laminating them, or by providing them in the form of a cablelike bundle of thin rods, it is also possible—either in place of these pressure members or in addition thereto—to design the link pins or rocking pins which connect the adjacent chain links to each other so as to form pressure members for transmitting the power by friction by dividing their end surfaces in a direction transverse to the direction of travel of the chain. This may even be done by providing the link pins in the form of tubular members and by mounting therein separate pressure members so as to be movable transversely of the link pins.

The ability of the new chain to transmit power may according to another feature of the invention be further improved and its useful life span may be further extended by making the laminated pressure members or those in the form of cables of thin rods of a length exceeding the width of the link chains, so that the projecting ends of these pressure members will bend elastically when entering between the surfaces of the pulley disks. Due to wear, the ends of the individual surface elements will then become rounded, and even though the wear upon these ends might be considerable, they will always remain rounded so that the same excellent frictional engagement of these surface elements with the pulley surfaces will be maintained until they are worn off completely. This flexibility of the pressure elements also has the great advantage that, when the individual surface elements are rounded, gaps of an increased size are formed between them which are adapted to take up the lubricant which has been displaced from the points of contact of the rounded surface elements with the pulley surfaces.

If the laminated or cablelike pressure members project sufficiently from the link chains, while their central parts may be regarded as being clamped within the transverse apertures in the links, the extent at which the projecting ends are bent depends primarily upon the tension of the chain. In order to make the desired bending of the individual parts of the laminated or cablelike pressure members as independent as possible of the tension of the chain, and to make the specific bending stresses upon these individual parts as small as possible, and at the same time to permit the width of the chain to be made as narrow as possible, it has been found advisable to increase the width of the apertures in the chain links from the center toward their outer ends or, vice versa, to provide a central constriction therein, so that the thin individual sheets or rods of the pressure members may already bend partly within the apertures under the pressure exerted upon their ends by the pulley surfaces. The projecting ends of these pressure members may then be made very short and the total width and bulk of the chain may be reduced.

The chain links containing the apertures for receiving the pressure members may each be either composed in the usual manner of several butt straps or fishplates or be made of one-piece elements. In the former case, the increasing width of the apertures from their center to their outer ends may be simply attained by making the apertures in the outer straps of a slightly larger diameter than those in the central straps and by possibly also tapering them toward the outer sides.

The above-mentioned objects, features and advantages of the present invention will become more clearly apparent from the following description which is to be read with reference to the accompanying drawings of several preferred embodiments of the invention, in which—

Figure 3:
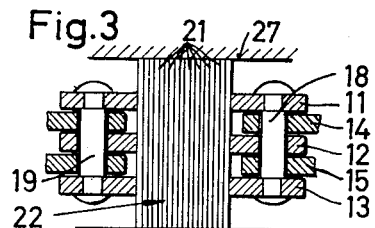
FIGURE 3 shows a cross section taken along line III—III of FIGURE 1 and also indicates the inner surfaces of the cone pulley disks.
Figure 4:
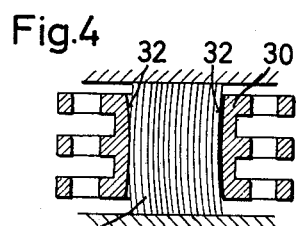
FIGURE 4 shows a cross section similar to that of FIGURE 3 of a modification of the invention.
Figures 5, 6, 7:
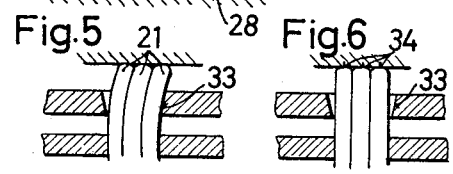
Figure 8:
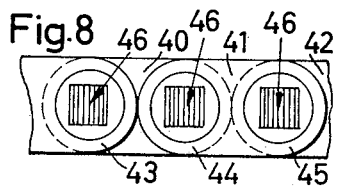
Figure 9:
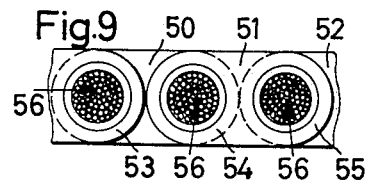
Figure 10:
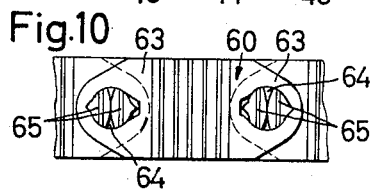
Figure 11:
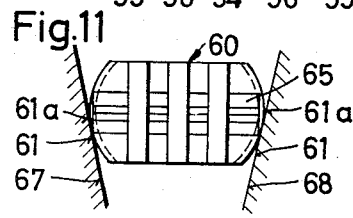
Figure 12:
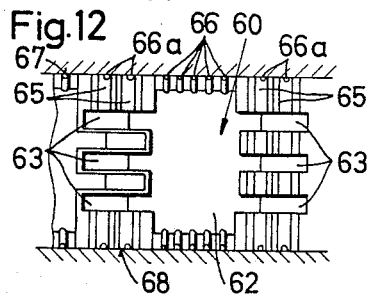

FIGURES 5, 6, and 7 show enlarged portions of FIGURES 3 and 4;

FIGURE 8 shows a side view of another modification of the invention;

FIGURE 9 shows a side view of a further modification of the invention;

FIGURE 10 shows a side view of a further modification of the invention;

FIGURE 11 shows a front view of the chain link according to FIGURE 10;

FIGURE 12 shows a plan view of the chain link according to FIGURE 10; while

Figure 13:
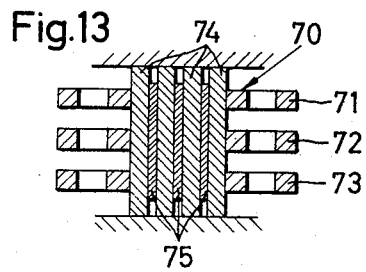

FIGURE 13 shows a cross section similar to that of FIGURE 3 of still another modification of the invention.

Figure 1:
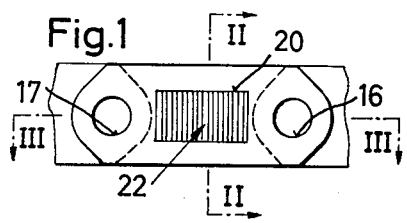
FIGURE 1 shows a side view of a chain link according to the invention and of parts of the two adjacent links.
Figure 2:
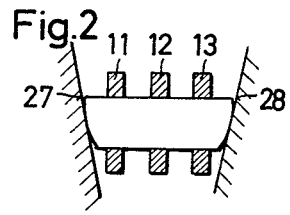
FIGURE 2 shows a cross section taken along line II—II of FIGURE 1 and also indicates the opposite inner surfaces of the cone pulley disks.

In the drawings, FIGURES 1 to 3 illustrate the first embodiment of the invention in the form of a chain link which is composed of a plurality of butt straps or fishplates 11, 12, and 13 which are pivotably connected to straps 14 and 15 of the adjacent links by means of link pins 18 and 19 which are mounted in bores 16 and 17 in the straps. Centrally between bores 16 and 17 straps 11 to 15 are provided with coinciding rectangular apertures 20 in which a pressure member 22 is mounted so as to be transversely movable with a sliding fit. This pressure member 22 is laminated and consists of a large number of thin sheets 21 which engage with each other within planes extending substantially vertically to the direction of travel of the chain. The end surfaces of sheets 21 of each compression element 22 engage with the opposite inner surfaces 27 and 28 of the respective cone pulley. Sheets 21 project from both sides of the chain link and may be regarded as being clamped within apertures 20 in straps 11 to 15 so that only these projecting ends of sheets 21 can bend elastically under the frictional forces acting thereon.

FIGURE 4 shows a chain link 30 which consists of a single piece of material and has a central aperture, the opposite walls 32 of which facing in the direction of travel of the chain are curved so that sheets 31 of the compression element will be able to bend more easily and their specific bending strain will be reduced. Furthermore, the free ends of sheets 31 projecting at both sides from chain link 30 may also be shorter than in the embodiment according to FIGURES 1 to 3 so that the total width of the chain will be reduced.

The same effect may also be attained with a chain which is designed in accordance with FIGURES 1 to 3 if the apertures 33 in the outer butt straps are enlarged and tapered toward the outside, as indicated diagrammatically in FIGURES 5 to 7 which also shown that sheets 31 will bend once toward one side, will then return to their straight position when released, and will finally bend toward the other side. This occurs at every run of each chain link over the two cone pulleys. Due to the wear upon the end surface of sheets 21 or 31 of the compression elements, these end surfaces become rounded as shown at 34 and thereby form intermediate pockets 35 which quickly take up the lubricant. Since the rounded end surface 34 retain their rounded shape independently of the amount of wear thereon, the chain will always retain its excellent grip traction which also premits the pressure of the axially movable disks of the cone pulleys against the chain links to be relatively small.

FIGURE 8 shows a further embodiment of the invention in which the link pins 43, 44, and 45 which connect the adjacent chain links 40, 41, and 42 are provided with apertures in which laminated pressure members 46 are mounted so as to be shiftable transversely.

FIGURE 9 shows an embodiment similar to that according to FIGURE 8, in which chain links 50, 51, and 52 are likewise pivotably connected by hollow link pins 53, 54, and 55 which contain pressure members 56. Each of the these pressure members 56 consists, however, of a tight cable-like bundle of thin rods of any desired cross-sectional shape extending transverse to the direction of travel of the chain.

The apertures in the link pins of the two last mentioned embodiments which contain the compression elements either in a laminated or cablelike form may also be enlarged toward the outside so as to permit the individual sheets or rods to bend more easily in the same manner as described with reference to FIGURES 5 to 7.

In the further embodiment of the invention according to FIGURES 10 to 12, each chain link 60 consists of a single piece of material, the central part 62 of which is provided with opposite cylindrical contact surfaces 61 at both sides with straps 63 which have transverse bores 64 for connecting each link to the adjacent links. These bores 64 contain rocking pins 65 of a length equal to the width of the chain links. The cylindrical contact surfaces 61 of the links and the corresponding end surfaces of the rocking pins are provided with cuts or notches 66 and 66a which extend transversely to the direction of travel of the chain and divide these contact surfaces into a larger number of surface elements which are adapted to engage with the smooth friction surfaces 67 of the cone pulley disks. By this division of each contact surface 61 by notches 66 into a plurality of surface elements the same effect is attained as by the thin sheets or rods of the laminated pack or cable, namely, that the contact surface is interrupted in the direction of the transmission of power by friction so that even at small contact pressures a surfboard effect between the surface elements of the compression elements and the surfaces 67 and 68 of the cone-pulley disks can never occur as the result of which the chain would start to slip by entering the range of hydrodynamic friction within which only extremely low frictional values can be attained.

Even though it achieves the desired advantages of the present invention, a one-piece chain link of a design as shown in FIGURE 12 has the disadvantage that its production is very expensive. This may be avoided by making the chain link 70 of individual butt straps 71, 72, and 73, as shown in FIGURE 13, which are provided with apertures which may also increase in size toward the outside in the manner as shown in FIGURES 5 to 7. Instead of providing a series of cuts or notches 66 in a solid piece of material as shown in FIGURE 12, a separate laminated pressure member is inserted into the apertures in straps 71, 72, and 73 according to FIGURE 13. This pressure member consists of a plurality of sheets 74 for transmitting the frictional forces and of shorter sheets 75 intermediate the adjacent sheets 74. Obviously, instead of being made of individual butt straps or fishplates, chain link 70 may also be made of a single piece of material similarly as illustrated in FIGURE 4.

Although our invention has been illustrated and described with reference to the preferred embodiments thereof, we wish to have it understood that it is in no way limited ot the details of such embodiments, but is capable of numerous modifications within the scope of the appended claims.

Having thus fully disclosed our invention, what we claim is:

1. In combination with a cone pulley having opposed smooth lubricated surfaces, a link chain comprising, in combination, a plurality of chain links, each link having transverse openings therethrough aligned with openings in adjacent links, pin means passing through said openings, each link having a plurality of pressure members disposed one after the other in the longitudinal direction of the chain extending from each side of such link having outer contact surfaces having spaces therebetween engaging the opposed surfaces of the cone pulley, and means mounting the pin means and pressure members for movement one with respect to the other transversely of the chain.

2. In combination with a cone pulley having opposed smooth lubricated surfaces, a link chain comprising, in combination, a plurality of chain links, each link having transverse openings therethrough aligned with openings in adjacent links, pin means passing through said openings, each link having at least one opening extending transversely therethrough, and a plurality of straight pressure members disposed one behind the other in the longitudinal direction of the chain mounted in each opening for movement transversely of the chain, said pressure members extending from each side such link and having outer contact surfaces having spaces therebetween engaging the opposed surfaces of the cone pulley.

3. In a device as claimed in claim 2, said pressure members comprising pressure plates arranged in planes perpendicular to the longitudinal axis of the chain.

4. In a device as claimed in claim 3, spacer plates between the pressure plates.

5. In a device as claimed in claim 2, said pressure members comprising rods.

6. In a device as claimed in claim 1, said link being formed in one piece with said pressure members, said pin means being slidable in said openings.

References Cited in the file of this patent
UNITED STATES PATENTS

| | | |
|---|---|---|
| 1,814,883 | Abbot | July 14, 1931 |
| 2,154,648 | Weston | Apr. 18, 1939 |
| 2,690,678 | Bendall | Oct. 5, 1954 |